(12) United States Patent
Hsieh et al.

(10) Patent No.: US 8,977,068 B2
(45) Date of Patent: *Mar. 10, 2015

(54) TRANSFORM SPACE DIFFERENCE COMPRESSION

(71) Applicant: Microsoft Corporation, Redmond, WA (US)

(72) Inventors: Paul Johan Hsieh, San Jose, CA (US); Denis Sergeyevich Shchepetov, Grayslake, IL (US); Sridhar Sankuratri, Campbell, CA (US); Damien Gerard Saint Macary, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/034,084

(22) Filed: Sep. 23, 2013

(65) Prior Publication Data

US 2014/0056534 A1 Feb. 27, 2014

Related U.S. Application Data

(63) Continuation of application No. 13/110,762, filed on May 18, 2011, now Pat. No. 8,542,934.

(51) Int. Cl.
*G06K 9/36* (2006.01)
*G06T 9/00* (2006.01)
*H04N 19/60* (2014.01)

(52) U.S. Cl.
CPC . *G06T 9/007* (2013.01); *G06K 9/36* (2013.01); *H04N 19/00775* (2013.01)
USPC .......................................................... 382/248

(58) Field of Classification Search
CPC ......... G06K 9/36; G06K 9/522; G06K 9/527; G06K 9/6232; G06K 9/6244; G06K 9/6245; G06K 9/748; H04N 19/0009; H04N 19/00127; H04N 19/00145; H04N 19/00157; H04N 19/00169; H04N 19/00218; H04N 19/00266; H04N 19/004; H04N 19/00484; H04N 19/00563; H04N 19/00587; H04N 19/00593; H04N 19/00775; H04N 19/00781; H04N 19/00903; H04N 19/23412; H04N 21/23424; H04N 21/2343; H04N 21/2365; H04N 21/4316; H04N 21/4347; H04N 21/44012

See application file for complete search history.

(56) References Cited

U.S. PATENT DOCUMENTS 5,473,376 A 12/1995 Auyeung
6,125,140 A 9/2000 Wilkinson (Continued)

OTHER PUBLICATIONS

Song, "Entropy Encoding in Wavelet Image Compression", Applied and Numerical Harmonic Analysis, 2008, 1-19.

(Continued)

*Primary Examiner* — Jose Couso
(74) *Attorney, Agent, or Firm* — Kate Drakos; Micky Minhas

(57) ABSTRACT

An invention is disclosed for performing differencing of graphical data in post-transform space for a remote presentation session. Graphical data is transformed from a first representation to a second representation (e.g. with a DWT), and then a difference is taken of the post-transform data and the post-transform data of the frame that preceded the current frame. This difference is then encoded and transmitted to a client, which decodes it, and creates a representation of the graphical data using the delta, and a previously determined representation of the previous frame. By performing differencing in post-transform space, fidelity of the remote presentation session is retained while it may decrease bandwidth. This may occur because the entropy of the delta representation is usually lower than a non-delta representation while the scheme retains the identical data of the final decoded image of the non-delta version of the same compression scheme.

20 Claims, 10 Drawing Sheets

(56) References Cited

U.S. PATENT DOCUMENTS

| | | |
|---|---|---|
| 7,006,699 B2 | 2/2006 | Malvar |
| 7,076,108 B2 | 7/2006 | Huang et al. |
| 7,162,091 B2 | 1/2007 | Wang et al. |
| 8,127,233 B2 * | 2/2012 | McDowell .................... 715/748 |
| 8,155,202 B2 * | 4/2012 | Landau .................... 375/240.16 |
| 8,285,268 B2 * | 10/2012 | Herle ........................... 455/418 |
| 8,331,438 B2 * | 12/2012 | Chang et al. ............. 375/240.03 |
| 8,542,934 B2 | 9/2013 | Hsieh et al. |
| 2005/0111741 A1 | 5/2005 | Kim et al. |
| 2006/0146191 A1 | 7/2006 | Kim et al. |

OTHER PUBLICATIONS

Wilson, "Understanding Digital Video Compression", Ericsson Review, 2009, 22-26.

* cited by examiner

TRANSFORM SPACE DIFFERENCE COMPRESSION

CROSS REFERENCE TO RELATED APPLICATIONS

This application is a continuation of U.S. patent application Ser. No. 13/110,762 filed May 18, 2011, which is hereby incorporated by reference in its entirety.

BACKGROUND

In a remote presentation session, a client computer and a server computer communicate across a communications network. The client sends the server locally-received input, such as mouse cursor movements and keyboard presses. In turn, the server receives this input and performs processing associated with it, such as executing an application in a user session. When the server's processing results in output, such as graphical output or sound, this output is sent to the client for presentation. In this manner, applications appear to a user of the client to execute on the client when, they in fact, execute on the server.

The graphical output generated by the server in a remote presentation often taxes, or even exceeds, the bandwidth available between the client and the server. In view of this limitation of bandwidth, it is common for the server to compress the graphical data before transmitting it across the communications network. When the client receives this compressed data, it then un-compresses the data before displaying it.

There are many problems with compressing graphical data for transmission across a communications network, some of which are well known.

SUMMARY

One way that images are compressed for transmission in a remote presentation session stems from the fact that, often, these images are a sequence of images of a user's computer desktop and application windows. Where these images represent multiple snapshots of the desktop per second, there are many times when there is little difference between two consecutive images. Where there is little difference between an image that is being sent to the client and an image that the client already possesses, bandwidth may be preserved by not sending the entirety of this new image, but rather only the differences between the old image and the new image. Techniques that comprise sending the difference between the old image and the new image are generally referred to as "differencing" or "delta" techniques.

There also differencing techniques that use motion compensation. In motion compensation techniques, data redundancy, including positional displacement, is determined. While motion compensation may produce good predictive redundancy encoding, it is computationally expensive to compute the motion compensation.

There are also differencing techniques that use pre-transform differencing. Here, in the process of preparing image data to send to a remote presentation client, the image data is transformed from a first representation to a second representation. An example of such an image transform is a discrete wavelet transform (DWT). Such transformations take visual data and convert them to data with high entropy, where high values correspond to noticeable image features and low values are less noticeable. A problem with techniques that calculate a difference before performing an image transform is that the visual importance of color values in pre-transform space may not correspond to their independent absolute values (whereas the relationship between importance and absolute value may be stronger in post-transform space), so after performing pre-transform differencing then applying the transform, quantizing by scaling to remove the least-significant bits of the values weakens the underlying assumptions of the transform and thus can produce anomalies not seen in a non-delta solution. There is an additional problem that deltas performed before the transform have to be against decoded prior frames, not the raw image since that is the data the client will have. Since that data is not intrinsically available on the encoder side, it also needs to be calculated there as well.

In embodiments of the invention then, differencing is performed in post-transform space rather than pre-transform space. An image is first transformed from a first representation to a second representation then it is optionally quantized. Then the transformed and quantized data is differenced against a transformed and quantized version of the previous frame to produce a delta. This delta is entropy encoded and transmitted to a client for display in a remote presentation session. By performing differencing after performing image transformation and quantization, full data integrity is preserved so fidelity of the remote presentation session will be maintained while it may decrease bandwidth.

DETAILED DESCRIPTION OF ILLUSTRATIVE EMBODIMENTS

Figure 1:
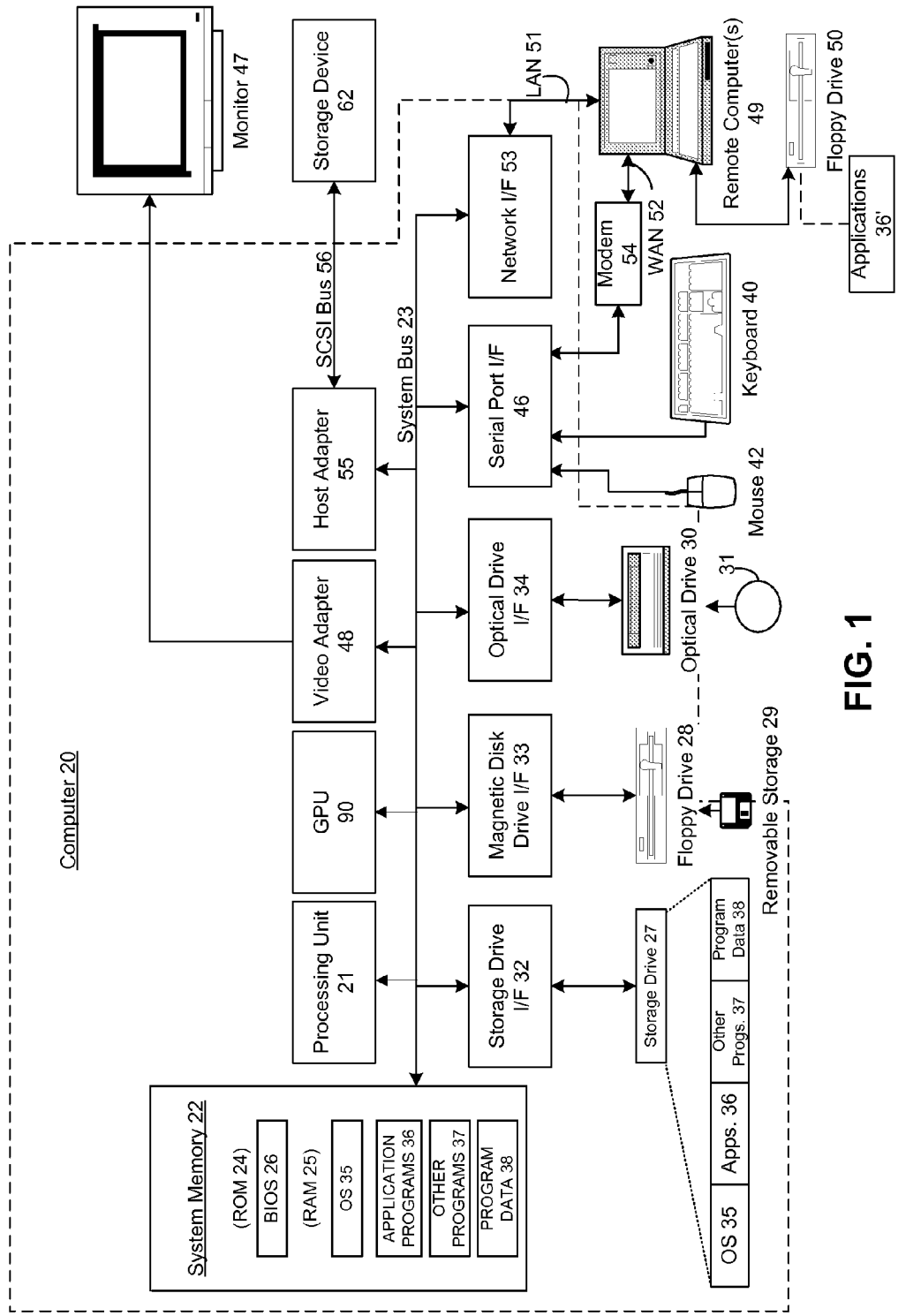
FIG. 1 depicts an example general purpose computing environment in which embodiments of the invention may be implemented.

Embodiments of the invention may execute on one or more computer systems. FIG. 1 and the following discussion are intended to provide a brief general description of a suitable computing environment in which embodiments of the invention may be implemented.

FIG. 1 depicts an example general purpose computing system. The general purpose computing system may include a conventional computer 20 or the like, including processing unit 21. Processing unit 21 may comprise one or more processors, each of which may have one or more processing cores. A multi-core processor, as processors that have more than one processing core are frequently called, comprises multiple processors contained within a single chip package.

Computer 20 may also comprise graphics processing unit (GPU) 90. GPU 90 is a specialized microprocessor optimized to manipulate computer graphics. Processing unit 21 may offload work to GPU 90. GPU 90 may have its own graphics memory, and/or may have access to a portion of system memory 22. As with processing unit 21, GPU 90 may comprise one or more processing units, each having one or more cores.

Computer 20 may also comprise a system memory 22, and a system bus 23 that communicative couples various system components including the system memory 22 to the processing unit 21 when the system is in an operational state. The system memory 22 can include read only memory (ROM) 24 and random access memory (RAM) 25. A basic input/output system 26 (BIOS), containing the basic routines that help to transfer information between elements within the computer 20, such as during start up, is stored in ROM 24. The system bus 23 may be any of several types of bus structures including a memory bus or memory controller, a peripheral bus, or a local bus, which implements any of a variety of bus architectures. Coupled to system bus 23 may be a direct memory access (DMA) controller 80 that is configured to read from and/or write to memory independently of processing unit 21. Additionally, devices connected to system bus 23, such as storage drive I/F 32 or magnetic disk drive I/F 33 may be configured to also read from and/or write to memory independently of processing unit 21, without the use of DMA controller 80.

The computer 20 may further include a storage drive 27 for reading from and writing to a hard disk (not shown) or a solid-state disk (SSD) (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer-readable storage media provide non-volatile storage of computer readable instructions, data structures, program modules and other data for the computer 20. Although the example environment described herein employs a hard disk, a removable magnetic disk 29 and a removable optical disk 31, it should be appreciated by those skilled in the art that other types of computer readable media which can store data that is accessible by a computer, such as flash memory cards, digital video discs or digital versatile discs (DVDs), random access memories (RAMs), read only memories (ROMs) and the like may also be used in the example operating environment. Generally, such computer readable storage media can be used in some embodiments to store processor executable instructions embodying aspects of the present disclosure. Computer 20 may also comprise a host adapter 55 that connects to a storage device 62 via a small computer system interface (SCSI) bus 56.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37, and program data 38. Upon execution by the processing unit, the computer-readable instructions cause actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the INTERNET. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In an embodiment where computer 20 is configured to operate in a networked environment, OS 35 is stored remotely on a network, and computer 20 may netboot this remotely-stored OS rather than booting from a locally-stored OS. In an embodiment, computer 20 comprises a thin client where OS 35 is less than a full OS, but rather a kernel that is configured to handle networking and display output, such as on monitor 47.

Figure 2:
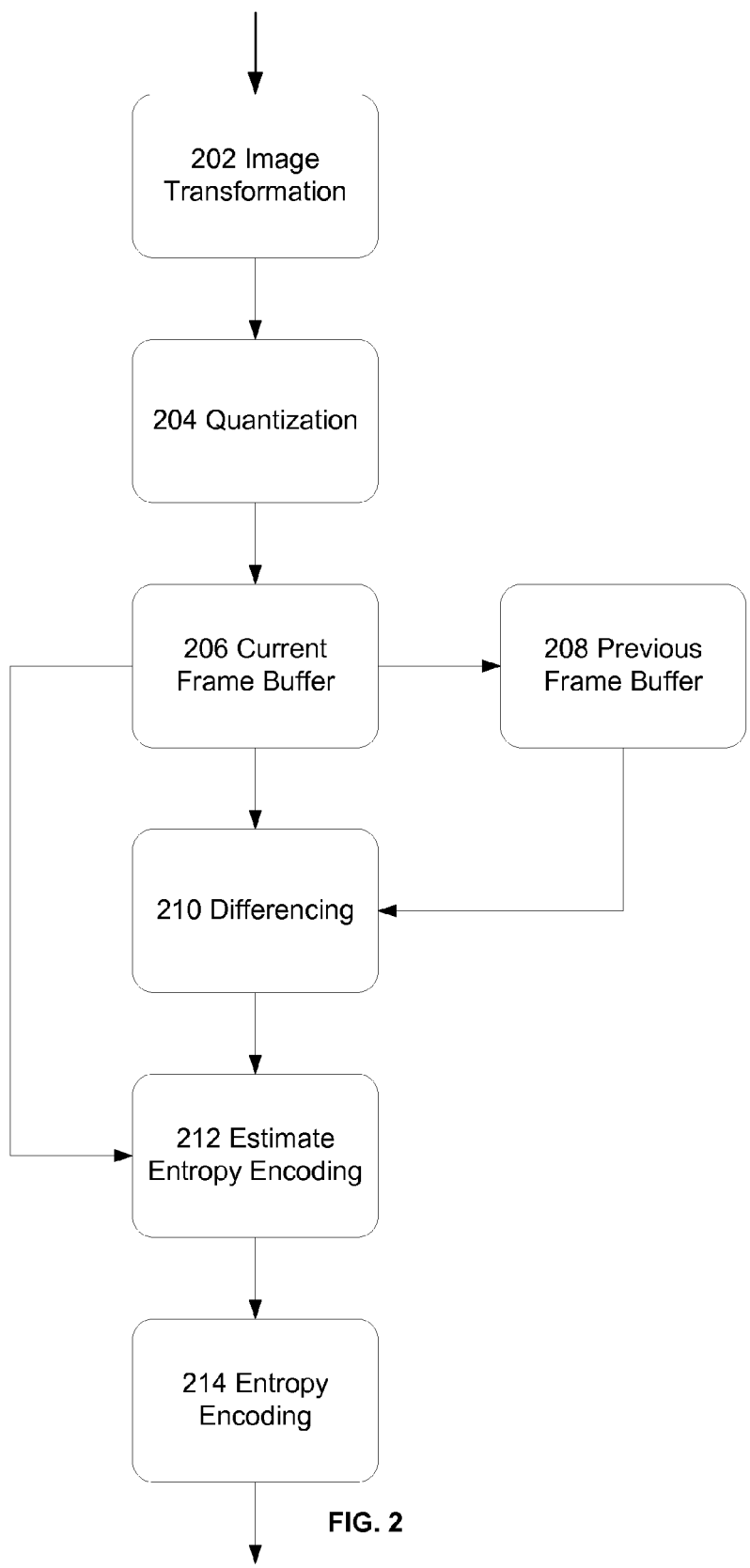
FIG. 2 depicts an example process flow for differencing data in post-transform space.

FIG. 2 depicts an example process flow for differencing data in post-transform space. In embodiments, the process flow of FIG. 2 may be implemented as processor-executable instructions stored in memory 22 of FIG. 1, and executed by processor 21 to cause the process flow to occur. It may be appreciated that there are embodiments of the invention that do not implement all components depicted in FIG. 2, or that implement the components (or a subset thereof) in a different permutation than is depicted in FIG. 2.

The data may be initially transformed by image transformation component 202. The data processed by image transformation component 202 may be a frame of image data in a remote presentation session (sometimes referred to herein as "graphical data"). A remote presentation server that implements the process flow of FIG. 2 may take a sequence of frames (e.g. a display of a computer desktop over time), and process them for transmission to a client across a communications network.

An image transform is a transform that converts an image from a first representation to a second representation. An example of an image transform is a discrete wavelet transform (DWT). A DWT is a wavelet transform in which the wavelets are discretely (as opposed to continuously) sampled. A DWT is commonly used to transform an image into a representation that is more easily compressed than the original representation, and then compress the post-transform representation of the image. A DWT is reversible, inasmuch as where a DWT may be used to transform an image from a first representation to a second representation, there is an inverse transform that may be used to transform the image from the second representation to the first representation. An example of a DWT is the transform used in the JPEG 2000 (Joint Picture Experts Group) image compression standard.

A DWT decomposes the individual color components of the array of pixels of an image into corresponding color sub-bands. For example, after a single transform, an image may be decomposed into four sub-bands of pixels, one corresponding to a first-level low (LL) pass sub-band, and three other first-level sub-bands corresponding to horizontal (HL), vertical (LH), and diagonal high pass (HH) sub-bands. Generally, the decomposed image shows a coarse approximation image in the LL sub-band, and three detail images in higher sub-bands. Each first-level sub-band is a fourth of the size of the original image (i.e., 32×32 pixels in the instance that the original image was 64×64 pixels). The first-level low pass band can further be decomposed to obtain another level of decomposition thereby producing second-level sub-bands. The second-level LL sub-band can be further decomposed into four third-level sub-bands.

Where a DWT has been used to decompose an image to third-level sub-bands, an inverse DWT may be used to compose the third-level sub band images into a second-level LL sub-band image. The inverse DWT may then be used to take the second-level LL sub-band image, a second-level LH sub-band image, a second-level HL sub-band image, and a second-level HH sub-band image 716 and compose them to form first-level a LL sub-band image. Finally, the inverse DWT may be used to take the first-level LL sub-band image, a first-level LH sub-band image, a first-level HL sub-band image, and a first-level HH sub-band image and compose them into the image.

In embodiments, an image transform such as DWT may be used to generate an array of coefficients that correspond to the frequencies present in the image. The coefficients in the array may then be quantized to both reduce the range of values that a coefficient may have, and zero-out coefficients with small values. Where quantization increases the amount of coefficients with a value of zero, then run-length encoding runs of zeroes within the array will generally increase the amount of compression generated by such run-length encoding relative to the un-quantized array.

After the data has been transformed by image transformation component 202, the transformed data is quantized by quantization component 204. Quantization component 204 allows data to be more easily compressed by converting it from a larger range of possible values to a smaller range of possible values. For instance, the data may comprise a plurality of pixel values—each pixel value comprising three separate 8-bit values. 8 bits may range from 0 to 255. To quantize this data, each value may be logically shifted at least one bit to the right, so that the values now range over 7 bits, or from 0 to 127. Even though the values now range over a 7-bit space, they may still be stored using 8 bits (a 0 having been prepended to each value). However, this act of quantizing the data enables the data to be more greatly compressed at a later stage of the process flow of FIG. 2, such as by entropy encoding component 214.

After the data has been quantized by quantization component 204, the transformed data is stored in current frame buffer 206, and the frame that preceded it (the frame that was previously stored in current frame buffer 206) is transferred to and stored in previous frame buffer 208. In embodiments, there is not a transfer operation of data from current frame buffer 206 to previous frame buffer 208. Rather, each frame remains in the place in memory where it is stored, and the system that implements the process flow of FIG. 2 keeps track which of these stored frames is the current frame and which is the immediate previous frame, and updates these indications as new current frames are processed.

Differencing component 210 uses both the frame stored in current frame buffer 206 and the frame stored in previous frame buffer 208 to calculate a difference of the two frames. Some of the possible techniques for the differencing component 210 to use are described with respect to FIGS. 5 and 6. A remote presentation session client already has a copy of the previous frame (or a representation thereof, if lossy compression is used further on in the process flow; also, the client frame may not yet possess a copy of the previous frame; it may be in transit across a communications network, or the client may have lost its copy, as is described in greater detail with respect to FIG. 12). Since the client already has the previous frame, or will soon be receiving it, the client may produce the current frame when provided only with the changes between the current frame and the previous frame, rather than the entire current frame. In a remote presentation session, these frames may be very similar, because they are frames of the same computer desktop. Given that, taking a difference of the two frames may result in many values being set to zero (where the corresponding values in the two frames are the same). Where many zeroes are produced as a result of differencing the frames, performing run-length compression of the differenced delta to reduce runs of zeros may result in large, lossless compression.

After differencing component 210 has produced a delta (or "difference") between the current frame and the previous frame, this delta is compared against the current frame by estimate entropy encoding component 212. Estimate entropy encoding component 212 estimates whether entropy encoding the delta or the current frame results in a smaller output, in terms of bits. There may be situations where n encoded delta actually occupies more space than its corresponding encoded frame. Where this is the case, a remote presentation session server may save bandwidth by transmitting the encoded frame instead of the encoded delta. However, it may be computationally- and time-expensive to encode both the delta and the frame itself and compare the results. In view of that, an estimation of which encoded data—the delta or the frame—is smaller may be made, and the result of this estimation comparison may be encoded. Using an estimation may not always result in the smallest encoded data, but it may be preferable to conclusively determining the better choice due to avoiding the cost of truly determining, instead of estimating, which is the preferred result.

Estimate entropy encoding component 212 may perform this estimation by counting the number of zeros in each of the delta and the frame itself, and determining whichever has the greater number of zeros to be the result of the estimation. In embodiments, rather than counting the number of zeros, estimate entropy encoding component 212 may count the number of values below a threshold.

After estimate entropy encoding component 212 has determined whether to encode the delta or the frame itself, whichever of those two entropy encoding component determined to have entropy encoded is sent to entropy encoding component

214. Entropy encoding component 214 entropy encodes the received input and outputs entropy encoded data that may be transmitted by the remote presentation session server to the client across a communications network. Entropy encoding component 214 may comprise run-length encoding the data, entropy encoding the data, and bit-packing the data, as is described with respect to FIGS. 7-9.

Each of FIGS. 3-9 depict data of a frame as it may exist at various points within the example process flow of FIG. 2.

Figure 3:
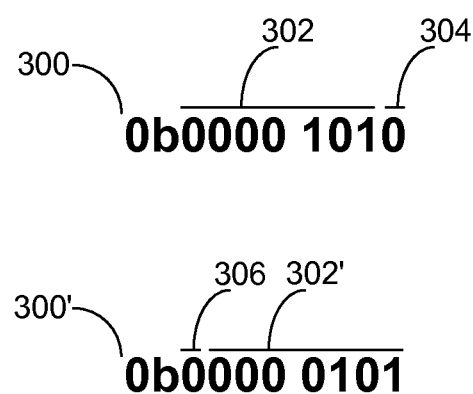
FIG. 3 depicts quantizing data.

FIG. 3 depicts quantizing data. In embodiments, providing data 300 as input to quantization component 204 of FIG. 2 results in an output of quantized data 300'. Quantizing data comprises converting data from a larger range of values to a smaller range of values. As depicted, data 300 and quantized data 300' both comprise 8 bits. Data 300 ranges from 0 to 255, inclusive (0b0000 0000 to 0b1111 1111), while quantized data 300' ranges from the smaller space of 0 to 127 inclusive (0b0000 0000 to 0b0111 1111). This quantization may be accomplished by logically shifting all of the bits to the right by one bit, dropping the rightmost bit, and adding a 0 to the newly vacant leftmost position. That is, bits 302 are the same as bits 302', only in a different position, bit 304 is dropped, and bit 306 is newly added.

Where a sequence of values is quantized, each value within the sequence may be quantized, rather than the sequence as a whole. That is, if the sequence comprises 10 8-bit values, each of those 8-bit values is separately quantized, rather than merely quantizing the full 80 bit sequence of those 10 values as a whole.

Figure 4:
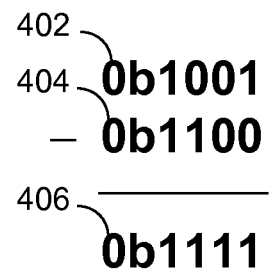
FIG. 4 depicts performing differencing data using wrapping subtraction operations.

FIG. 4 depicts performing differencing data using wrapping subtraction operations. In embodiments, providing numbers 402 and 404 as input to differencing component 210 of FIG. 2 results in output comprising number 406. Wrapping subtraction is similar to modular arithmetic, in that, when a subtraction would result in a negative number in a non-wrapping scenario, in wrapping, a negative number is expressed as a positive number confined to an allowable range of values.

As depicted, each of numbers 402-406 are 4-bit values that can range from 0 to 15 (0b0000 to 0b1111). Number 402 is 0b1001, or 9. Number 404 is 0b1100, or 10. In non-wrapping subtraction, 8 minus 9 would be −1. However, here wrapping subtraction is used, and the result of subtracting number 404 from number 402 is shown as number 406, which is 0b1111 (15). In this space confined from 0 to 15, 15 is equivalent to −1 in that 15 is 1 integer wrapped past zero (3 to 2 to 1 to 0 to 15 to 14 . . . ).

Figure 5:
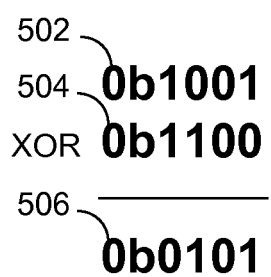
FIG. 5 depicts performing differencing data using exclusive-or operations.

FIG. 5 depicts performing differencing data using exclusive-or operations. In embodiments, providing numbers 502 and 504 as input to differencing component 210 of FIG. 2 results in output comprising number 506. In an exclusive or, or XOR, two bits are compared. Where they are both 1 or both 0, the result is 0. Where one is 1 and the other is 0, the result is 1. Both the first and third bits (counting from the leftmost bit) of numbers 502 and 504 are the same—both first bits are 1 and both third bits are 0. So, the result of XORing those bits is 0 in both cases—and this is reflected in the first and third bits of result 506 being 0. The second and fourth bits of numbers 502 and 504 differ from the second and fourth bits in the other number, so the result of XORing these bits is 1 in both cases, and this is reflected in the second and fourth bits of result 506 being 1. Put another way, 0b1001 XOR 0b1100=0b0101.

Figure 6:
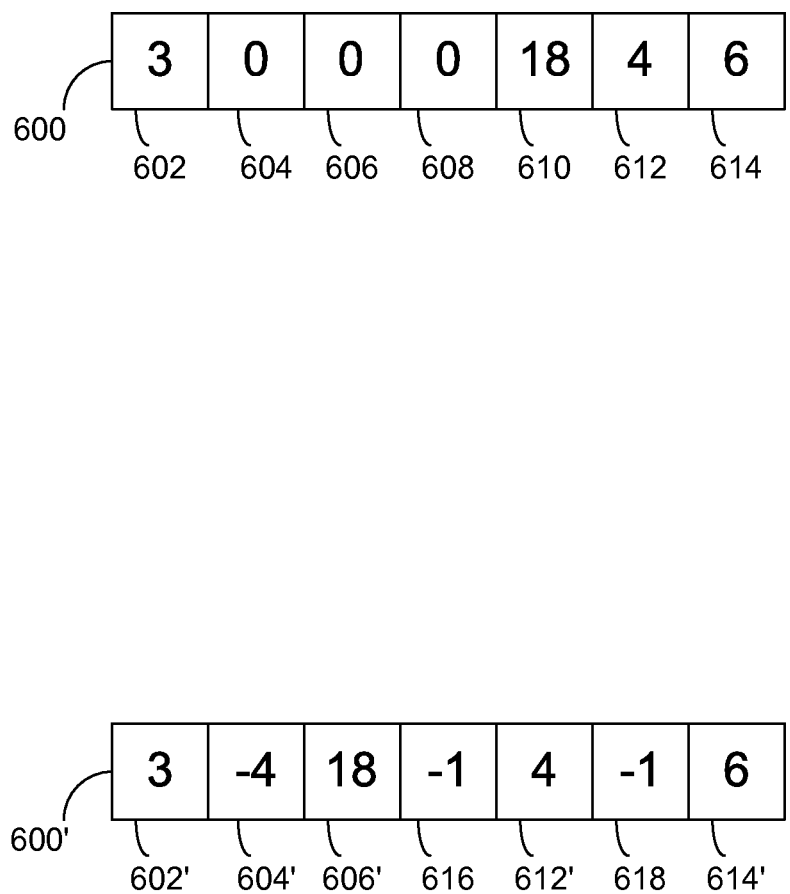
FIG. 6 depicts run-length encoding data.

FIG. 6 depicts run-length encoding data. Run-length encoding may be performed on the delta of FIG. 5 to compress the delta losslessly by compressing runs of zeros. In embodiments, run-length encoding as depicted in FIG. 6 is performed by entropy encoding component 214 of FIG. 2. As depicted, the sequence of values 600 is run-length encoded into the run-length encoded sequence of values 600'. Each of sequence 600 and 600' may comprise an array of values. Sequence 600 comprises values 602-614, which are 3, −4, 18, −1, 4, −1, and 6, respectively. The first value in each of sequence 600 and sequence 600' (respectively, 602 and 602') is 3. This value of 3 remains unchanged between arrays because it is not equal to zero, and thus not encoded. Then value 604', which is −4, represents all of values 604, 606, and 608—a run of three zeros. Those three zeros are represented as a negative number equal to the negative of the number of zeros, minus 1. Here, that is −(3)−1=−4. Value 606' is 18, the same as value 610 (again, unchanged because it is not part of a run of zeros). Value 608' is −1, a reserved number used as a divider between non-zero values from sequence 600. Value 610' is 4, same as value 612. Value 612' is another divider of −1. Finally, value 614' is 6, same as value 614.

In embodiments, inserting a reserved divider number between nonzero values may be useful in increasing the speed at which an entropy encoder may operate.

Figure 7:
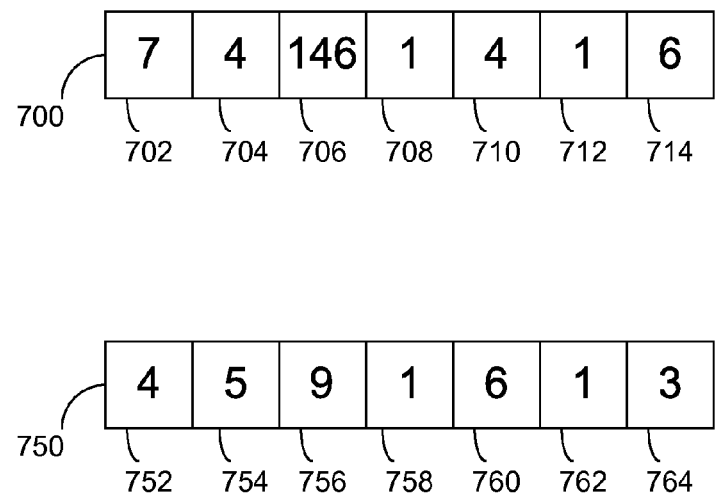
FIG. 7 depicts entropy encoding data.
Figure 8:
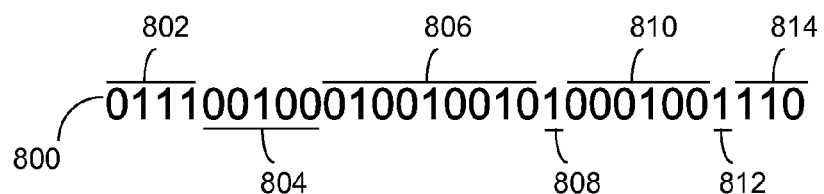
FIG. 8 depicts bit packing data.

FIG. 7 depicts entropy encoding data. Entropy encoding may be performed on the run-length encoded data of FIG. 6 in conjunction with bit-packing the data as depicted in FIG. 8 to further compress the data. In embodiments, entropy encoding as depicted in FIG. 7 is performed by entropy encoding component 214 of FIG. 2.

Sequence 700 comprises a set of values corresponding to run-length encoding sequence 600' and sequence 750 a set of lengths that correspond to those values of sequence 700. In an embodiment, values 702-714 are stored in sequence 700 as an array of 16-bit short integers. The rightmost bits of each of the values contained within sequence 700 equals the value of the corresponding value contained within sequence 600'. That is, value 702 is 7, or 0b111, and corresponding value 602' is 3, or 0b11. The rightmost two bits of 0b111 are equal to 0b11. Likewise, value 706 is 146, or 0b10010010, and corresponding value 606' is 18, or 0b10010. The rightmost 5 bits of 0b10010010 are equal to 0b10010. This likewise applies for values 704 and 604', 708 and 608', 710 and 610', 712 and 612', and 714 and 614'.

With respect to sequence 750, this sequence represents the bit lengths to be used to represent the values in sequence 700. In an embodiment, these bit lengths 752-764 are stored in array 700 as 16-bit short integers. For example, bit length 752 is 4, signifying that value 702 will be represented using 4 bits. Value 702 is 7, which can be represented using 3 bits—0b111. Even though 7 can be represented using 3 bits, 4 bits will be used to represent is according to the entropy encoding scheme—0b0111. Likewise, value 704—4—can be represented using 3 bits (0b100), but according to bit length 754 shall be represented using 5 bits (0b00100) according to the entropy encoding scheme. The same applies for bit lengths and values 756 and 706, 758 and 708, 760 and 710, 762 and 712, and 764 and 714, respectively.

Those leftmost bits not used to represent the value in sequence 700' may be used to determine how many bits are used to represent the value. For instance, value 606' is 18, entropy-encoded value 706 is 146 and bit-length 756 is 9. That is, 146 is encoded with 9 bits as 0b010010010. The five rightmost bits of 0b010010010 (0b10010) encode 18 in binary, and then the remaining 4 leftmost bits (0b0100) are used to signify how many total bits are used to encode 18 with the entropy encoder. Where the leftmost bit is 0, this signifies that the number of bits used to represent the value in sequence 600' differs from the number of bits used to represent the previous value in sequence 600' (for the first element of sequence 600', this is determined relative to one bit). Where the leftmost bit is 1, this signifies that the number of bits used to represent the value in sequence 600' does not differ from the number of bits used to represent the previous value in sequence 600' (and, in fact, signifies that there are no "leftmost bits" as the term is used herein; that leftmost 1 is the first bit of the rightmost bits—the value itself).

Where the leftmost bit is zero (signifying a change to the number of bits used to represent a value in sequence 600' relative to the value before it), the second leftmost bit signifies whether the number of bits is to be increased or decreased. A 1 signifies an increase and a zero signifies a decrease. The number of zeros that follow this second bit signify the amount of increase or decrease. The amount of increase or decrease is equal to one more than the number of these zeros. Then, the next leftmost 1 is both a terminator for this run of zeros, and the first bit of representing the value in sequence 600' itself (e.g. the first rightmost bit as the term is used herein).

FIG. 8 depicts bit packing data. Bit packing data may be performed on the run-length encoded data of FIG. 6 in conjunction with entropy encoding the data as depicted in FIG. 7 to further compress the data. In embodiments, bit packing as depicted in FIG. 8 is performed by entropy encoding component 214 of FIG. 2.

There are 4 bits in 802, representing a binary encoding of 7, and the two rightmost bits encode 3. These numbers—4, 7, and 3—are the bit-length 752, entropy-encoded value 702, and run-length-encoded value 602', respectively. Likewise, bits 804 is made up of 5 bits, as specified by bit-length 754 as the number of bits to be used to express entropy-encoded value 704. Similar relationships hold for bits 806-814, bit-lengths 756-764, and entropy-encoded values 706-714.

Whereas all of the values in sequences 600, 600', 700 and 750 may be stored as 16-bit shorts with superfluous leading zeros, the output bitstream 800 removes these leading zeros to compress the representation of the values in sequence 600. For instance, where 16-bit shorts are used to represent the values in array 600, this would require 112 bits (7 values at 16 bits per value). However, these same 7 values may be represented in bitstream 800 with only 29 bits, as depicted, which is a savings of nearly 75%.

Figure 9:
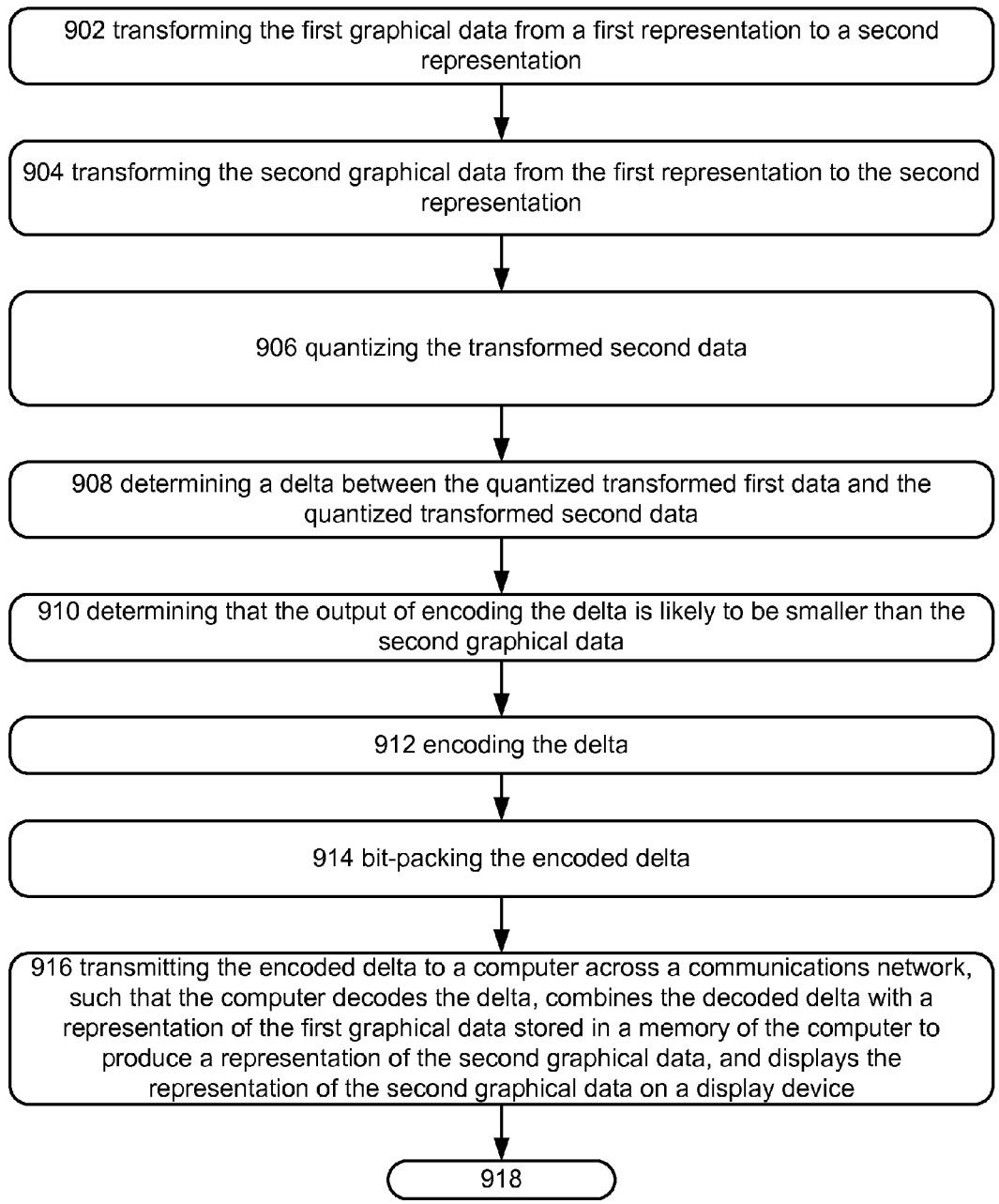
FIG. 9 depicts example operational procedures for differencing data in post-transform space.

FIG. 9 depicts example operational procedures for differencing data in post-transform space. Various operational procedures depicted in FIG. 9 may be used to produce the data manipulations depicted in FIGS. 3-8. In embodiments, the operational procedures of FIG. 9 may be implemented on computer 20 of FIG. 1 to effectuate a remote presentation session between computer 20 and remote computer 49 of FIG. 1. The operations of FIG. 9 may be used on a series of graphical data (such as frames of a computer desktop that is being sent across a remote presentation session) where a second graphical data is operated on after a first graphical data has already been operated on.

Operation 902 depicts transforming the first graphical data from a first representation to a second representation. Operation 902 may be used to produce a transformed first data, the transformed first data comprising a first set of values. In embodiments, operation 902 comprises transforming the data from a first representation to a second representation. The first set of values may comprise a set of values of coefficients to functions, such as produced by a DWT transform. Operation 904 may be effectuated in a similar fashion as discrete waveform transformation component 202 of FIG. 2 is effectuated.

Operation 904 depicts transforming the second graphical data from the first representation to the second representation. Operation 904 may be used to produce a transformed second data, the transformed second data comprising a second set of values. Operation 904 may be effectuated in a manner similar to operation 902.

Operation 906 depicts quantizing the transformed second data. This operation may comprise, where the transformed second data comprises a plurality of values, bitwise logically right-shifting each value, and discarding a least-significant bit of each value. This operation may be used to produce quantized data 300' from data 300. Operation 906 may be effectuated in a similar fashion as quantizing component 204 of FIG. 2 is effectuated.

Operation 908 depicts determining a delta between the transformed first data and the transformed second data. In embodiments, operation 908 is performed on the transformed first data and transformed second data after each has been quantized. In embodiments, this difference may be determined based on the first set of values and the second set of values, and used to produce a delta set of values. Operation 908 may be effectuated in a similar fashion as differencing component 210 of FIG. 2 is effectuated.

In embodiments operation 908 comprises performing wrapping subtraction on the transformed first data relative to the transformed second data. Wrapping subtraction may be implemented in a similar fashion as described with respect to how, in FIG. 4, numbers 404 is wrapping-subtracted from number 402 to produce number 406. In embodiments, operation 908 comprises performing a bitwise exclusive-or (XOR) on the transformed first data relative to the transformed second data. An XOR may be implemented in a similar fashion as described with respect to how, in FIG. 5, numbers 502 and 504 are XOR'ed to produce number 506.

In embodiments where the transformed second data comprises a plurality of 8-bit values, operation 908 may comprise converting each 8-bit value of the plurality of 8-bit values to a 16-bit value. Performing the differencing operation may cause an overflow to occur—an attempt to store a value that cannot be stored in 8-bits—and this overflow may spill over into the contiguous value, corrupting it. In such an instance, the values may be converted from 8 bits to 16 bits, so any overflow flows into the new 8 bits, rather than another value altogether.

Operation 910 depicts determining that the output of encoding the delta is likely to be smaller than the second graphical data. This may be effectuated in a similar manner as estimate entropy encoding component 212 of FIG. 2.

Operation 912 depicts encoding the delta. This operation may be performed on a set of values of the delta to produce an encoded delta. Operation 912 may be effectuated in a similar manner as entropy encoding component 214 of FIG. 2.

In embodiments where the delta comprises a plurality of values, operation 910 may comprise run-length encoding a sequence of one or more contiguous values of the plurality of values that are equal to zero. This run-length compressing may be effectuated in a similar fashion as described with respect to how, in FIG. 6, sequence of values 600 is run-length encoded to produce run-length encoded sequence of values 600'.

The operation of encoding the delta set of values as depicted in operation 914 may comprise entropy encoding the delta set of values. In entropy encoding, a value is encoded based on itself and the value that comes before it in an ordered sequence (or a reference value, if it is the first value in the sequence). For instance, in embodiments where the delta comprises a first value, a second value and a third value in a set of ordered values, the first value being contiguous to the second value in the set of ordered values, the second value being contiguous to the third value in the set of ordered values, operation 912 may comprise entropy encoding the second value based on the second value and the first value; and entropy encoding the third value based on the third value and the second value. That is, where the first, second, and third values appear contiguously in the set of values, the second value may be encoded based on itself and the first value (and no other values in the sequence), and the third value may be encoded based on itself and the second value (and no other values in the sequence).

Operation 914 depicts, bit-packing the encoded delta. The result of encoding a set of values may be that each value may be expressed using fewer bits than are contained in the data structure used to represent the value. For instance, the values in the sequence may be stored in 16-bit short integer data structures. Where the third value is 3, it may be that the value may be encoded using 7 bits, rather than the 16 in the data structure. In such a case, in bit packing, these nine superfluous bits may be discarded, to save on the space necessary to store the encoded values. Operation 914 may be effectuated in a manner similar to described with respect to FIG. 7, where set of values 700 is bit packed to produce bit-packed set of values 700'.

Operation 916 depicts transmitting the encoded delta to a computer across a communications network, such that the computer decodes the delta, combines the decoded delta with a representation of the first graphical data stored in a memory of the computer to produce a representation of the second graphical data, and displays the representation of the second graphical data on a display device. After the computer upon which the present operations are executed has encoded the delta, it may transmit the encoded delta to the client computer. This computer receives the encoded delta, and then decodes the delta to recreate the delta. The computer already has stored a representation of the first graphical data (it may be a copy of the first graphical data, or it may be a lossy version of the first graphical data, where lossy encoding or quantization of the first graphical data was performed by the server before sending it to the client). Since the delta comprises the differences between the first graphical data and the second graphical data, where the client combines the delta with the representation of the first graphical data, it may produce a representation of the second graphical data (again, either a copy of the second graphical data, or a lossy version of the second graphical data).

This combination of the delta and the representation of the first graphical data may be performed in a manner that reverses the determination of the delta performed in operation 908. For instance, where the delta is determined through wrapping subtraction, the combination may be determined through wrapping addition. Once a representation of the second graphical data has been produced, the client computer may display the representation of the second graphical data on a display device.

In embodiments, operation 916 comprises transmitting the encoded delta to the computer across the communications network, such that the computer decodes the delta to produce a decoded delta, combines the decoded delta with a representation of the first graphical data to produce a representation of the transformed second data, transforms the transformed second data from the second representation to the first representation to produce a representation of the second graphical data, and displays the representation of the second graphical data on the display device. That is, operation 916 may perform the reverse of operations 902-914. Where the data has been transformed from a first representation to a second representation, the data may be transformed back from the second representation to the first representation. Likewise, where the data has been encoded, it may be decoded, and the reverse of other operations may be implemented.

In embodiments where the graphical data comprises part of an image, operation 916 comprises transmitting an indication of a position of the second graphical data within the image, such that the computer displays the representation of the second graphical data at the position along with displaying a representation of the image. A tiling scheme may be used in a remote presentation session. Each image of a computer desktop is subdivided into a plurality of tiles. Then, in embodiments, only the tiles that are updated are sent to the client, along with an indication of the position where those tiles are positioned within the greater image of the computer desktop.

It may be appreciated that there are embodiments of the invention that do not implement every operation depicted in FIG. 9, or that implement the operations of FIG. 9 (or a subset thereof) in an order different than is depicted in FIG. 9. In embodiments of the invention, the operational procedures of FIG. 9 end with operation 918. In other embodiments of the invention, the operational procedures of FIG. 9 flow to FIG. 10, or FIG. 11, which are united to FIG. 9 by their shared depiction of operation 918.

Figure 10:
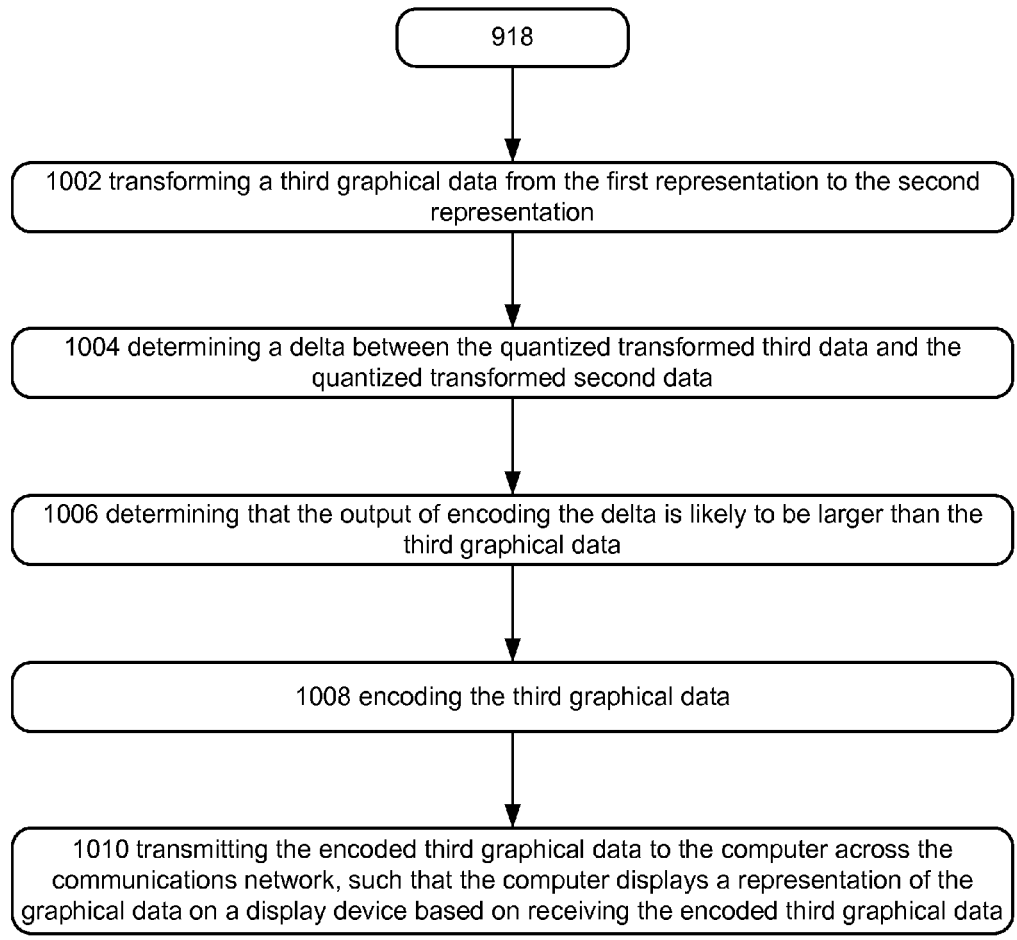
FIG. 10 depicts operational procedures for differencing data in post-transform space in addition to the operational procedures of FIG. 9.

FIG. 10 depicts operational procedures for differencing data in post-transform space in addition to the operational procedures of FIG. 9. In embodiments of the invention, after performing operation 916 in FIG. 9, the operations flow to operation 918, which is the last operation depicted in FIG. 9, and the first operation depicted in FIG. 10.

It may be that not all frames of graphical data are sent to the client as deltas. Where it requires less bandwidth to send the encoded frame itself (or a lossy representation thereof) rather than the delta, this "absolute" data may be sent instead of the delta. In operation 1020, while the second graphical data was sent as a delta of the first graphical data, here the third graphical data is sent as absolute data, instead of as a delta of the second graphical data.

It may be preferable to send absolute data instead of delta data in a situation where the new frame has data that is unrelated to the previous frame, and this new unrelated data is easily compressible in its absolute form (such as if it contains long strings of zero values, which can be run-length compressed).

It may be a computationally- and time-expensive process to encode both the delta and the absolute data, and then compare the two to see which requires less bandwidth to transmit. Instead, a less computationally- and time-expensive estimation of the sizes of the delta and the absolute may be performed. This may be performed in a similar manner as estimate entropy encoding component 212 of FIG. 2.

Operation 1002 depicts transforming a third graphical data from the first representation to the second representation. Operation 1002 may be effectuated in a similar manner as operation 904 of FIG. 9.

Operation 1004 depicts determining a delta between the transformed third data and the transformed second data. In embodiments, operation 1004 is performed on the transformed third data and transformed second data after each has been quantized. Operation 1004 may be effectuated in a similar manner as operation 908 of FIG. 9.

Operation 1006 depicts determining that the output of encoding the delta is likely to be larger than the third graphical data. This may be the case, for instance, where the third graphical data has little relation to the second graphical data, so expressing the third graphical data in terms of the differences between it and the second graphical data is likely to require more storage space than the third graphical data itself.

Operation 1008 depicts encoding the third graphical data. Operation 1008 may be effectuated in a similar manner as operation 912 of FIG. 9.

Operation 1010 depicts transmitting the encoded third graphical data to the computer across the communications network, such that the computer displays a representation of the graphical data on a display device based on receiving the encoded third graphical data. In contrast to operation 916 of FIG. 9, here the computer displays a representation of the third graphical data without doing so in reference to a representation of the second graphical data. To distinguish between the present sending of a complete or "absolute" graphical data from sending only a delta graphical data, the device which implements the operational procedures of FIG. 10 may send the computer an indication of what type of graphical data is being sent (absolute or delta).

Figure 11:
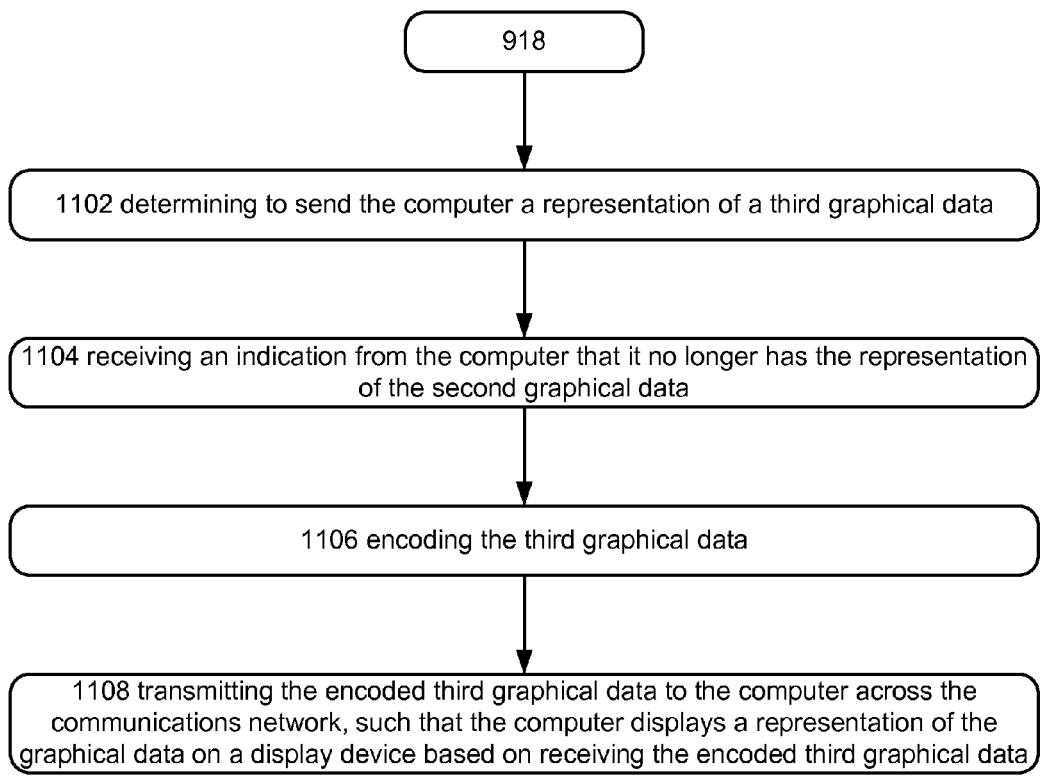
FIG. 11 depicts further operational procedures for differencing data in post-transform space in addition to the operational procedures of FIG. 9.

FIG. 11 depicts further operational procedures for differencing data in post-transform space in addition to the operational procedures of FIG. 9. In embodiments of the invention, after performing operation 916 in FIG. 9, the operations flow to operation 918, which is the last operation depicted in FIG. 9, and the first operation depicted in FIG. 10.

There may be times when the client loses its state—its possession of the previous frame (here, the representation of the second graphical data). For instance, the client's memory may become corrupted. In such a case, the client may send an indication to the server of this fact. The server may then, regardless of whether it estimates that the encoded absolute data or the encoded delta (based on the third graphical data) is smaller in size, send the encoded absolute data, so that the client may display a representation of the third graphical data on a display device.

Operation 1102 depicts determining to send the computer a representation of a third graphical data. This may occur, for instance, when a third graphical data is produced representing a frame of a computer desktop in a user session corresponding to a user that is conducting a remote presentation session between the computer and the device upon which the operational procedures of FIG. 11 are implemented.

Operation 1202 depicts receiving an indication from the computer that it no longer has the representation of the second graphical data. This may occur, for example, where the computer's memory location where it stores the second graphical data becomes corrupted and the computer determines this to be the case.

Operation 1106 depicts encoding the third graphical data. This operation may be effectuated in a manner similar to operation 912 of FIG. 9.

Operation 1108 depicts transmitting the encoded third graphical data to the computer across the communications network, such that the computer displays a representation of the graphical data on a display device based on receiving the encoded third graphical data. Operation 1108 may be effectuated in a manner similar to operation 1010 of FIG. 10. Since the computer has sent an indication that it no longer has the representation of the second graphical data, it may be that it expects absolute data rather than delta data to begin with, and thus, will recognize and process absolute data properly without receiving an indication that the data is absolute.

Figure 12:
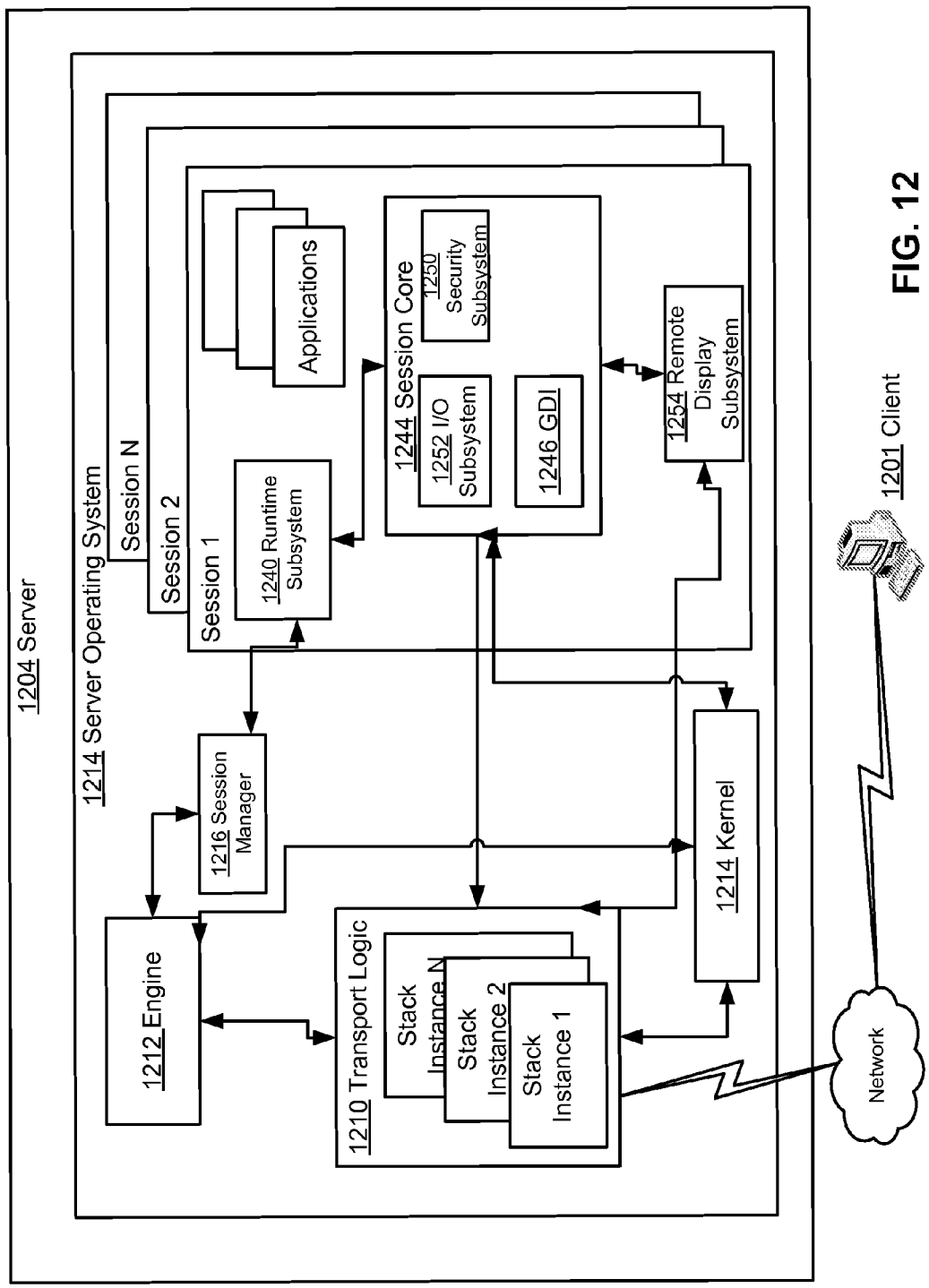
FIG. 12 depicts an example remote presentation session server wherein aspects of the present disclosure can be implemented.

FIG. 12 generally illustrates an example environment wherein aspects of the present invention can be implemented. For instance, the server 1204 may implement the operational procedures of FIGS. 9, 10 and/or 11. One skilled in the art can appreciate that the example elements depicted by FIG. 12 are illustrated to provide an operational framework for describing the present invention. Accordingly, in some embodiments the physical layout of each environment may be different depending on different implementation schemes. Thus the example operational framework is to be treated as illustrative only and in no way limit the scope of the claims.

Generally, FIG. 12 depicts a high level overview of a server environment that can be configured to include aspects of the present invention. In reference to the figure, depicted is a server 1204 that can include circuitry configured to effectuate a remote presentation session server, or in other embodiments the server 1204 can include circuitry configured to support remote desktop connections. In the depicted example, the server 1204 can be configured to generate one or more sessions for connecting clients such as sessions 1 through N (where N is an integer greater than 1). Briefly, a session in example embodiments of the present invention can generally include an operational environment that is effectuated by a plurality of subsystems, e.g., software code, that are configured to interact with a kernel 1214 of server 1204. For example, a session can include a process that instantiates a user interface such as a desktop window, the subsystems that track mouse movement within the window, the subsystems that translate a mouse click on an icon into commands that effectuate an instance of a program, etc. A session can be generated by the server 1204 on a user by user basis by the server 1204 when, for example, the server 1204 receives a connection request over a network connection from a client 1201. Generally, a connection request can first be handled by the transport logic 1210 that can, for example, be effectuated by circuitry of the server 1204. The transport logic 1210 can in some embodiments include a network adaptor; firmware, and software that can be configured to receive connection messages and forward them to the engine 1212. As illustrated by FIG. 12, the transport logic 1210 can in some embodiments include protocol stack instances for each session. Generally, each protocol stack instance can be configured to route user interface output to a client and route user input received from the client to the session core 1244 associated with its session.

Continuing with the general description of FIG. 12, the engine 1212 in some example embodiments of the present invention can be configured to process requests for sessions; determine the functionality for each session; generate sessions by allocating a set of physical resources for the session; and instantiating a protocol stack instance for the session. In some embodiments the engine 1212 can be effectuated by specialized circuitry components that can implement some of the above mentioned operational procedures. For example, the circuitry in some example embodiments can include memory and a processor that is configured to execute code that effectuates the engine 1212. As depicted by FIG. 12, in some instances the engine 1212 can receive connection requests and determine that, for example, a license is available and a session can be generated for the request. In the situation where the server 1204 is a remote computer that includes remote desktop capabilities, the engine 1212 can be configured to generate a session in response to a connection request without checking for a license. As illustrated by FIG. 12, a session manager 1216 can be configured to receive a message from an engine 1212 and in response to the message the session manager 1216 can add a session identifier to a table; assign memory to the session identifier; and generate system environment variables and instances of subsystem processes in memory assigned to the session identifier.

As illustrated by FIG. 12, the session manager 1216 can instantiate environment subsystems such as a runtime subsystem 1240 that can include a kernel mode part such as the session core 1244. For example, the environment subsystems in an embodiment are configured to expose some subset of services to application programs and provide an access point to the kernel of the operating system 1214. In example embodiments the runtime subsystem 1240 can control the execution of processes and threads and the session core 1244 can send requests to the executive of the kernel 1214 to allocate memory for the threads and schedule time for them to be executed. In an embodiment the session core 1244 can include a graphics display interface 1246 (GDI), a security subsystem 1250, and an input subsystem 1252. The input subsystem 1252 can in these embodiments be configured to receive user input from a client 1201 via the protocol stack instance associated with the session and transmit the input to the session core 1244 for the appropriate session. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 1244 and the input subsystem 1252 can be configured to determine that an icon is located at the coordinates associated with the double-click. The input subsystem 1252 can then be configured to send a notification to the runtime subsystem 1240 that can execute a process for the application associated with the icon.

In addition to receiving input from a client 1201, draw commands can be received from applications and/or a desktop and be processed by the GDI 1246. The GDI 1246 in general can include a process that can generate graphical object draw commands The GDI 1246 in this example embodiment can be configured to pass its output to the remote display subsystem 1254 where the commands are formatted for the display driver that is attached to the session. In certain example embodiments one or more physical displays can be attached to the server 1204, e.g., in a remote desktop situation. In these example embodiments the remote display subsystem 1254 can be configured to mirror the draw commands that are rendered by the display driver(s) of the remote computer system and transmit the mirrored information to the client 1201 via a stack instance associated with the session. In another example embodiment, where the server 1204 is a remote presentation session server, the remote display subsystem 1254 can be configured to include virtual display driver(s) that may not be associated with displays physically attacked to the server 1204, e.g., the server 1204 could be running headless. The remote display subsystem 1254 in this embodiment can be configured to receive draw commands for one or more virtual displays and transmit them to the client 1201 via a stack instance associated with the session. In an embodiment of the present invention, the remote display subsystem 1254 can be configured to determine the display resolution for each display driver, e.g., determine the display resolution of the virtual display driver(s) associated with virtual displays or the display resolution of the display drivers associated with physical displays; and route the packets to the client 1201 via the associated protocol stack instance.

In some example embodiments the session manager 1216 can additionally instantiate an instance of a logon process associated with the session identifier of the session that can be configured to handle logon and logoff for the session. In these example embodiments drawing commands indicative of the graphical user interface associated with the logon process can be transmitted to the client 1201 where a user of the client 1201 can input an account identifier, e.g., a username/password combination, a smart card identifier, and/or biometric information into a logon screen. The information can be transmitted to server 1204 and routed to the engine 1212 and the security subsystem 1250 of the session core 1244. For example, in certain example embodiments the engine 1212 can be configured to determine whether the user account is associated with a license; and the security subsystem 1250 can be configured to generate a security token for the session.

While the present disclosure has been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. The invention may be implemented with computer-readable storage media and/or computer-readable communication media. Thus, the invention, or certain aspects or portions thereof, may take the form of program code (i.e., instructions) embodied in tangible media, such as floppy diskettes, CD-ROMs, hard drives, or any other machine-readable storage medium. Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A system for compressing a second graphical data that occurs in a sequence of graphical data after a first graphical data, comprising:
    a processor; and
    a memory communicatively coupled to the processor when the system is operational, the memory bearing processor-executable instructions that, upon execution by the processor, cause the system at least to:
        transform the first graphical data from a first representation to a second representation to produce a first transformed first data;
        transform the second graphical data from the first representation to the second representation to produce a transformed second data;
        determine a difference between a set of values of the transformed first data and a set of values of the transformed second data to produce a delta set of values; and
        transmit a representation of the delta set of values to a computer across a communications network.

2. The system of claim 1, wherein the memory further bears instructions that, upon execution by the processor, cause the system at least to:
    encode the delta set of values in response to estimating that a size of the encoded delta set of values as stored in memory is less than a size of the delta set of values as stored in memory; and
    transmit representation of the delta set of values to the computer across a communications network, the representation of the delta set of values comprising the encoded delta set of values.

3. The system of claim 2, wherein the memory further bears instructions that, upon execution by the processor, cause the system at least to:

transform a second graphical data from the first representation to the second representation to produce a transformed third data;
determine a difference between the set of values of the transformed second data and a set of values of the transformed third data to produce a second delta set of values; and
in response to estimating that a size of the encoding the second delta set of values as stored in memory is greater than a size of the second delta set of values as stored in memory, sending the second delta set of values to the computer.

4. The system of claim 1, wherein the instructions that, upon execution by the processor, cause the system at least to determine the difference between the set of values of the transformed first data and the set of values of the transformed second data further cause the system at least to:
quantize the transformed first data to determine a quantized and transformed first data;
quantize the transformed second data to produce a quantized and transformed second data; and
determine the difference between a set of values of the quantized and transformed first data and a set of values of the quantized and transformed second data.

5. The system of claim 4, wherein the instructions that, upon execution by the processor, cause the system at least to quantize the transformed first data to determine the quantized and transformed first data cause the system at least to:
bitwise logically right-shifting each value of the transformed first data and discarding at least a least-significant bit of each value to determine the quantized and transformed first data.

6. The system of claim 1, wherein the instructions that, upon execution by the processor, cause the system at least to determine the difference between the set of values of the transformed first data and the set of values of the transformed second data further cause the system at least to:
perform wrapping subtraction on the set of values of the transformed first data relative to the set of values of the transformed second data.

7. The system of claim 1, wherein the instructions that, upon execution by the processor, cause the system at least to determine the difference between the set of values of the transformed first data and the set of values of the transformed second data further cause the system at least to:
perform a bitwise exclusive-or on the set of values of the transformed first data relative to the set of values of the transformed second data.

8. The system of claim 1, wherein the instructions that, upon execution by the processor, cause the system at least to transmit the representation of the delta set of values to the computer across the communications network further cause the system at least to:
encode the delta set of values to produce an encoded delta; and
transmit the representation of the delta set of values to the computer across the communications network, the representation of the delta set of values comprising the encoded delta.

9. The system of claim 1, wherein the instructions that, upon execution by the processor, cause the system at least to transmit the representation of the delta set of values to the computer across the communications network further cause the system at least to:
transmit the representation of the delta set of values to the computer across the communications network, such that the computer decodes the delta, combines the representation of the delta set of values with a representation of the first graphical data stored in a memory of the computer to produce a representation of the second graphical data in the second representation, converts the second graphical data in the second representation to the first representation, and displays the second graphical data in the first representation on a display device.

10. A method carried out on one or more processors for compressing a second graphical data that occurs in a sequence of graphical data after a first graphical data, comprising:
transforming on the one or more processors the first graphical data from a first representation to a second representation to produce a first transformed first data;
transforming on the one or more processors the second graphical data from the first representation to the second representation to produce a transformed second data;
determining on the one or more processors a difference between a set of values of the transformed first data and a set of values of the transformed second data to produce a delta set of values; and
transmitting on the one or more processors a representation of the delta set of values to a computer across a communications network.

11. The method of claim 10, wherein transforming on the one or more processors the first graphical data from the first representation to the second representation to produce the first transformed first data comprises:
transforming the first graphical data with a discrete wavelet transform (DWT).

12. The method of claim 10, wherein determining on the one or more processors the difference between the set of values of the transformed first data and the set of values of the transformed second data to produce a delta set of values comprises:
bitwise logically left-shifting each value of the set of values of the transformed first data, and discarding a least-significant bit of each value, and then determining the difference between the set of values of the transformed first data and the set of values of the transformed second data.

13. The method of claim 10, wherein transmitting on the one or more processors the representation of the delta set of values to the computer across a communications network comprises:
run-length encoding a sequence of one or more contiguous values in the delta set of values, and then transmitting the representation of the delta set of values to the computer across a communications network.

14. The method of claim 10, wherein transmitting on the one or more processors the representation of the delta set of values to the computer across a communications network comprises:
bit-packing the values of the delta set of values to express at least one of the values of the delta set of values in fewer bits than are contained in a data structure used to represent each value of the delta set of values before transmitting the representation of the delta set of values to the computer across a communications network.

15. The method of claim 10, further comprising:
determining on the one or more processors to send the computer a representation of a third graphical data; and
in response to receiving an indication from the computer the computer does not possess a representation of the second graphical data, transmitting a representation of the third graphical data to the computer without determining a difference between a transformed third data and the transformed second data.

16. A computer-readable storage device for compressing a second graphical data that occurs in a sequence of graphical data after a first graphical data, bearing computer-readable instructions that, when executed upon a computer, cause the computer to perform operations comprising:
- transforming the first graphical data from a first representation to a second representation to produce a first transformed first data;
- transforming the second graphical data from the first representation to the second representation to produce a transformed second data;
- determining a difference between a set of values of the transformed first data and a set of values of the transformed second data to produce a delta set of values; and
- transmitting a representation of the delta set of values to a second computer across a communications network.

17. The computer-readable storage device of claim 16, wherein the delta set of values comprises an ordered set comprising a first value, a second value, and a third value, the first value being contiguous to the second value, and the second value being contiguous to the third value, and wherein transmitting the representation of the delta set of values to the second computer comprises:
- entropy encoding the second value based on the second value and the first value
- entropy encoding the third value based on the third value and the second value; and
- transmitting the entropy encoded second value and entropy encoded third value to the second computer.

18. The computer-readable storage device of claim 16, wherein the transformed first data and the transformed second data each comprise a plurality of 8-bit values, and wherein determining the difference between the set of values of the transformed first data and the set of values of the transformed second data comprises:
- converting each 8-bit value to a 16-bit value before determining the difference between the set of values of the transformed first data and the set of values of the transformed second data.

19. The computer-readable storage device of claim 16, wherein the second graphical data comprises part of an image, and wherein transmitting the representation of the delta set of values to the second computer comprises:
- transmitting the representation of the delta set of values and an indication of a location of the second graphical data within the image to the second computer.

20. The computer-readable storage device of claim 16, wherein the first and second graphical data each comprise graphical output from an application executing in a user session, the first graphical data having been generated by the application at a time before the second graphical data was generated by the application.

* * * * *